United States Patent

Pecze et al.

[15] 3,651,715
[45] Mar. 28, 1972

[54] SAW SHARPENER, PARTICULARLY TO SHARPEN JUMP SAWS

[72] Inventors: Andras Pecze; Laszlo Suto; Zoltan Banoczi, all of Budapest, Hungary

[73] Assignee: Szerszamgepipari Muvek, Budapest, Hungary

[22] Filed: May 4, 1970

[21] Appl. No.: 34,355

[52] U.S. Cl. ................................................76/37, 76/76
[51] Int. Cl. ..........................................................B23d 63/12
[58] Field of Search ..........................................76/75, 76, 37

[56] References Cited

UNITED STATES PATENTS 1,490,668   4/1924   Herbert ....................................76/37

Primary Examiner—Bernard Stickney
Attorney—Young & Thompson

[57] ABSTRACT

A work holder has intermittent work feed along a path which is a series of semicircles. A work table oscillates bodily continuously about a vertical axis but the work is restrained during half of each revolution, at which time the work table slides under the restrained workpiece. To sharpen saw blades, the blade is disposed parallel to the axis of a grinding wheel and the diameter of the circle of oscillation is equal to the pitch of the saw teeth.

3 Claims, 5 Drawing Figures

3,651,715

SAW SHARPENER, PARTICULARLY TO SHARPEN JUMP SAWS

The present invention relates to work holders with intermittent work feed and methods of achieving such intermittent work feed. The invention has particular utility and will be illustrated in connection with the sharpening of the teeth of saw blades, particularly rip saws. It is to be understood, however, that the invention is applicable in any of a variety of work operations in which a workpiece must be moved intermittently through a work station.

It is an object of the present invention to provide work holders with intermittent feed, which operate at high speed.

Another object of the present invention is the provision of methods for intermittently advancing workpieces at high speed.

Still another object of the present invention is the provision of apparatus for sharpening saws, which operates at high speed.

A still further object of the present invention is the provision of methods for sharpening saws at high speed.

Finally, it is an object of the present invention to provide work holders for intermittently feeding workpieces, and saw-sharpening apparatus, which will be relatively simple and inexpensive to manufacture, easy to operate, maintain and repair, and rugged and durable in use.

Other objects and advantages of the present invention will become apparent from a consideration of the following description, taken in connection with the accompanying drawings, in which.

Figure 1:
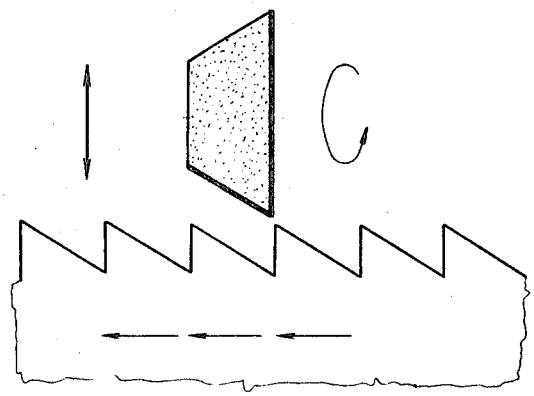
FIG. 1 is a diagrammatic view of the path followed by a saw blade and grinding wheel, during a first known course of procedure.

Referring now to the drawings in greater detail, and first to FIG. 1, there is shown schematically an arrangement for sharpening saw teeth, according to the prior art, in which the saw blade is advanced intermittently in the direction of the horizontal arrows in FIG. 1, while the grinding wheel is reciprocated in a direction perpendicular to its axis, during dwell periods of the saw blade, to sharpen successively each blade. This is the principle of operation of the so-called Vollmer machines.

Figure 2:
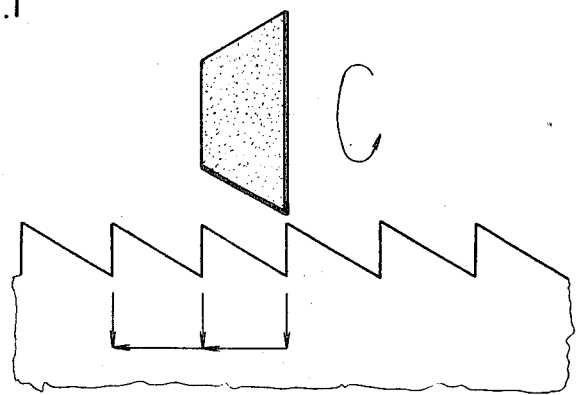
FIG. 2 is a view similar to FIG. 1 but showing the paths of movement during a second known operation, which is of the general category to which the present invention belongs.

In FIG. 2, another known arrangement is shown, in which the axis of the grinding wheel remains fixed and the blade is given a compound rectilinear motion as indicated by the arrows.

Figure 3:
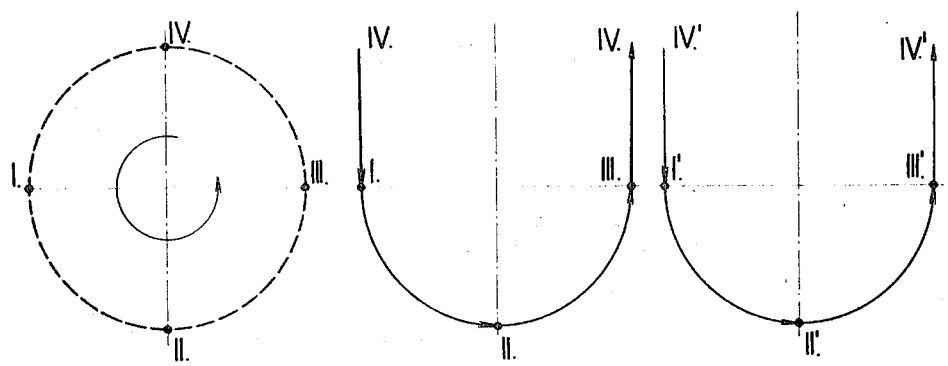
FIG. 3 is a series of three diagrams, the first showing the path of movement of the work table of the present invention, the second showing the path of movement of the workpiece during a first cycle of operation, and the third showing the path of the workpiece during a still further cycle of operation.

The principle of operation of the present invention is more nearly like that of FIG. 2 than that of FIG. 1, but differs fundamentally in that, instead of following a rectilinear path, the workpiece follows a scalloped path comprised of a plurality of semicircular paths at the junction of each pair of which the workpiece undergoes a dwell period during a work operation. This is achieved by imparting to the table on which the workpiece is supported a circular movement as shown in FIG. 3, but restraining the workpiece during half of each cycle of movement so that the workpiece moves with the work table through a semicircle but then is restrained while the work table completes the circle and slides under the restrained workpiece. Upon completion of the circle, the workpiece is then released from its restraint and resumes movement with the work table. The workpiece thus appears to advance by a series of semicircular hops, with the workpiece and work table moving together half the time and the work table sliding beneath the workpiece the other half of the time.

Figure 4:
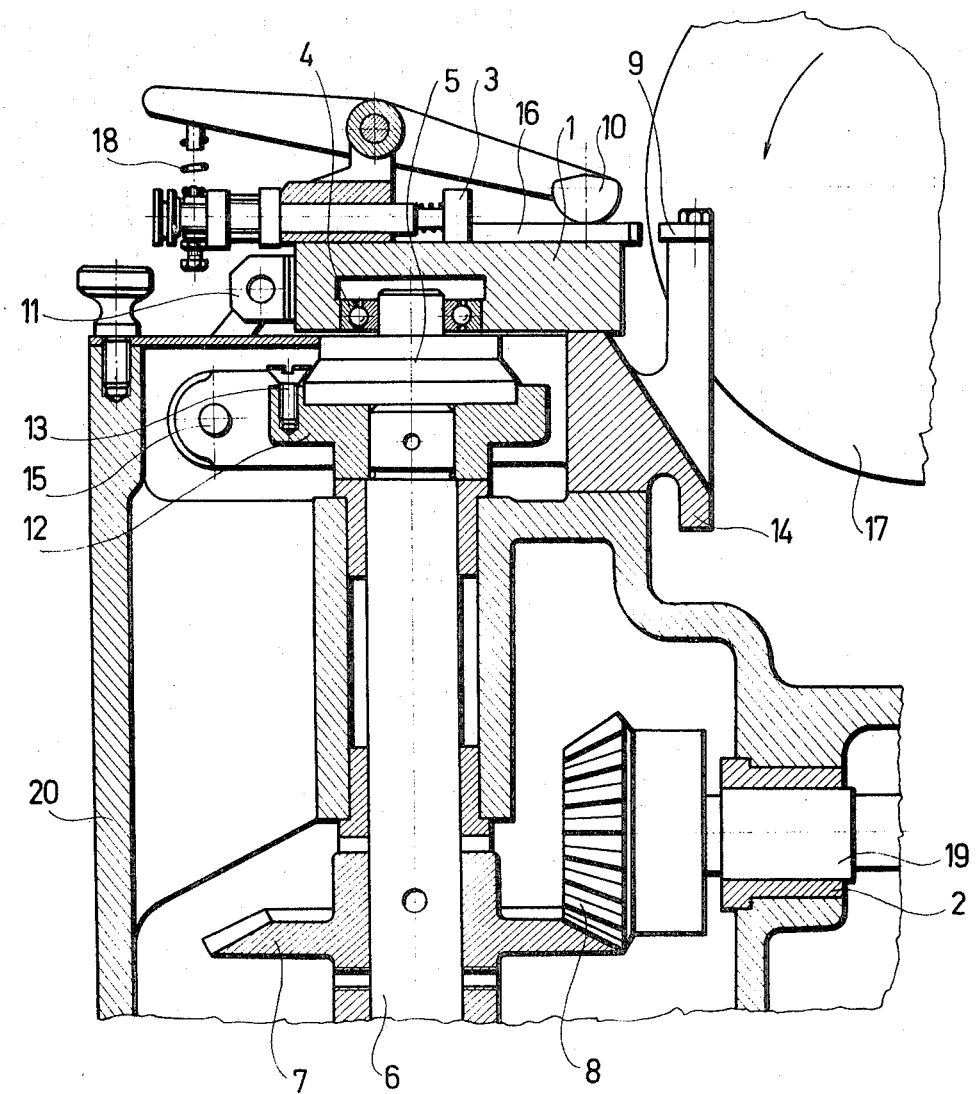
FIG. 4 is a side cross-sectional view of apparatus according to the present invention, viewed in the direction of the axis of the rotating tool, which is the direction of advance of the workpiece.
Figure 5:
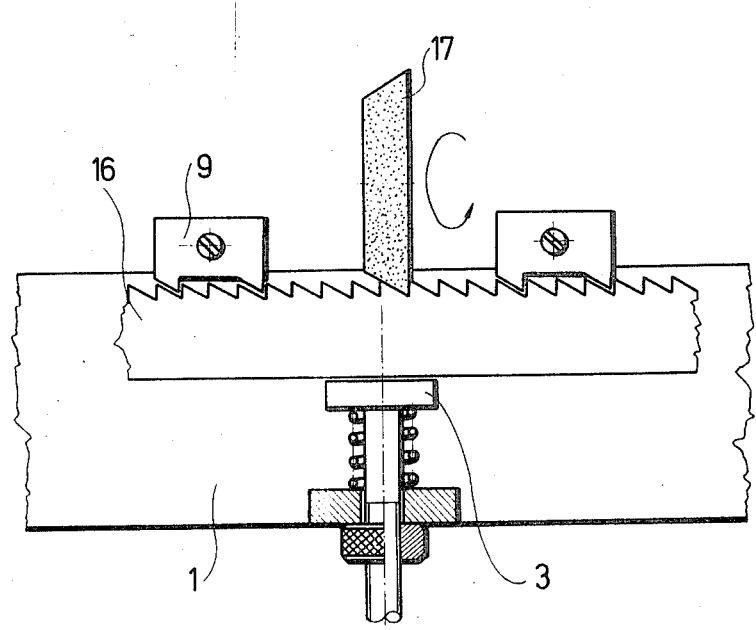
FIG. 5 is a fragmentary plan view of the structure shown in FIG. 4 and showing the relationship to each other of the workpiece, the work holder, and the tool.

Apparatus for achieving this is shown in greater detail in FIGS. 4 and 5. As shown in those figures, a work table 1 is provided for supporting on its upper surface a workpiece 16 which in the illustrated embodiment is a blade of a rip saw. The work station in connection with which the invention is illustrated is a grinding station for sharpening the teeth of a saw blade, comprising a tool 17 which in the illustrated embodiment is a grinding wheel mounted for rotation about a fixed axis which is generally parallel to the length of workpiece 16 and the path of advance of workpiece 16. Conventional means (not shown) are provided for rotating tool 17. A backup member 3 is a spring urged against workpiece 16 to urge the workpiece against the tool 17, while holddown members 10 in the form of a pair of first-class levers are yieldably urged by coil compression springs 18 downwardly against the upper surface of workpiece 16. The members 3 and 10 are carried by work table 1.

Swingably mounted guide means 11 slidably guide work table 1 so that it can have a circular movement without rotating. In other words, the positions of each edge of work table 1 always remain parallel to each other; although any given point on work table 1 moves in a circular path. To impart this rotary motion to work table 1 in a horizontal plane, a member 5 extends into a recess on the under side of work table 1 and is surrounded by a roller bearing 4 by which work table 1 is driven. Member 5 is fixed in a recess in a disc 12 by means of a plurality of screws 13. Disc 12, in turn, is rotated by a shaft 6 that carries a ring gear 7 that is driven by pinion 8 secured to a drive shaft 19 that rotates in a bushing 2 within the machine frame 20. A motor (not shown) drives shaft 19. The rotary movement is thus imparted to work table 1 by means of the eccentric pin upstanding from member 5 and disposed within bearing 4. This pin can be eccentric to member 5 and member 5 concentric with shaft 6; while alternatively, member 5 can be eccentric to shaft 6 and the upstanding pin concentric with member 5. Similarly, means for adjusting the eccentricity or throw of the eccentric pin are provided, either by making the position of member 5 adjustable within screws 13, or by providing an interchangeable plurality of members 5 each with a different eccentricity of the upstanding pin.

Housing 20 carries a bracket 14 thereon which provides a horizontal sliding base for work table 1. A threaded spindle 15 acts between bracket 14 and housing 20 to adjust bracket 14 in the feed direction of the workpiece.

Bracket 14 also carries detents 9 that have a shape complementary to the shape of the saw teeth, as seen in FIG. 5. The distance between detents 9 is a multiple of the pitch of the saw teeth, the pitch of the saw teeth being also equal to the length of an increment of workpiece movement as measured parallel to the axis of the grinding wheel, that is to say, parallel to the general direction of workpiece movement, which distance in turn is twice the throw of the eccentric. Preferably, detents 9 are adjustable in horizontal directions by adjustment means (not shown) so that their position may be made exact relative to the tool and the workpiece. Detents 9 are of course removable and interchangeable with detents of other shapes for other sizes and shapes of saw tooth or other workpiece.

In operation, with tool 17 rotating about a fixed axis and drive shaft 19 driven in rotation, work table 1 will slide horizontally with a circular motion as described above, on bracket 14, and members 10 will press workpiece 16 against table 1 so that workpiece 16 will tend to move with table 1. As table 1 moves through positions I–II–III as seen at the left of FIG. 3, workpiece 16 will move through positions I–II–III as seen at the center of FIG. 3. At position III, however, the teeth of the workpiece will catch on detents 9 and the further counterclockwise movement of the workpiece will be impeded while the tool sharpens the associated saw tooth. This is the position of the parts in FIG. 5.

Work table 1 will continue to rotate through positions III and IV and back to position I, but workpiece 16 will remain stationary so that there will be relative sliding movement between the workpiece and the work table. When table 1 again passes through position I on its way toward position II, however, the workpiece will then be released from detents 9 and will move through another half circle counterclockwise as seen at the right of FIG. 3 until it reaches position III' whereupon detents 9 will engage the next saw teeth and the grinding wheel will likewise engage and sharpen the next saw tooth.

It will of course be understood that the sliding movement of the workpiece relative to the work table is against not only the friction due to the pressure of spring-urged members 10 downward on the workpiece, but also against the spring-urged member 3. The member 3 is so positioned that the spring that urges it toward the workpiece will be substantially fully extended in positions I and III, whereupon the workpiece will move with the work table through positions I-II-III and can leave the continuously rotating tool. Thus, the function of the spring that urges member 3 toward the workpiece is to store energy while being compressed between positions III and IV of the work table as seen in FIG. 2, and to release that energy upon expansion between positions IV and I of FIG. 2 thereby to maintain the workpiece in contact with detents 9 through positions III-IV-I of FIG. 2.

The invention thus provides very much more rapid operation than has been possible with devices and methods known heretofore. In the particular case of sharpening saw teeth, it has been found possible to operate the machine at a frequency of 336 teeth per minute, which is about three times faster than previously known machines have been able to operate.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having thus described our invention, we claim:

1. Apparatus for sharpening the teeth of straight saws, comprising a grinding wheel rotatable about a fixed axis, a work table adjacent the wheel, an eccentric driving pin rotatably received in the underside of the work table, means to rotate the driving pin about and eccentric to an upright axis thereby continuously to impart bodily circular movement to the work table, a disc carrying said eccentric pin, means to clamp the disc in various positions to alter the eccentricity of the pin, holddown means on top of the work table to hold down the saw, said holddown means comprising a first-class lever having one end engaging the top of a saw, and compression spring means acting upwardly on the other end of the lever to urge said one end of the lever downwardly against the saw thereby yieldably to clamp the saw to the work table.

2. Apparatus as claimed in claim 1, and a backup member spring urged against the saw to urge the saw toward the wheel, said backup member having a flat upright surface that engages the edge of the saw remote from the wheel, a shaft perpendicular to and unitary with said upright surface and on the side of said upright surface opposite the saw, and coil compression spring means encircling said shaft and acting against a fixed abutment on the upper side of said work table to urge said surface against said saw.

3. Apparatus for sharpening the teeth of straight saws, comprising a grinding wheel rotatable about a fixed axis, a work table adjacent the wheel, an eccentric driving pin rotatably received in the underside of the work table, means to rotate the driving pin about and eccentric to an upright axis thereby continuously to impart bodily circular movement to the work table, a disc carrying said eccentric pin, means to clamp the disc in various positions to alter the eccentricity of the pin, and a backup member spring urged against the saw to urge the saw toward the wheel, said backup member having a flat upright surface that engages the edge of the saw remote from the wheel, a shaft perpendicular to and unitary with said upright surface and on the side of said upright surface opposite the saw, and coil compression spring means encircling said shaft and acting against a fixed abutment on the upper side of said work table to urge said surface against said saw.

* * * * *